May 20, 1930.  C. CARMOSIN  1,759,433
SAFETY GAS COCK
Filed Aug. 1, 1928
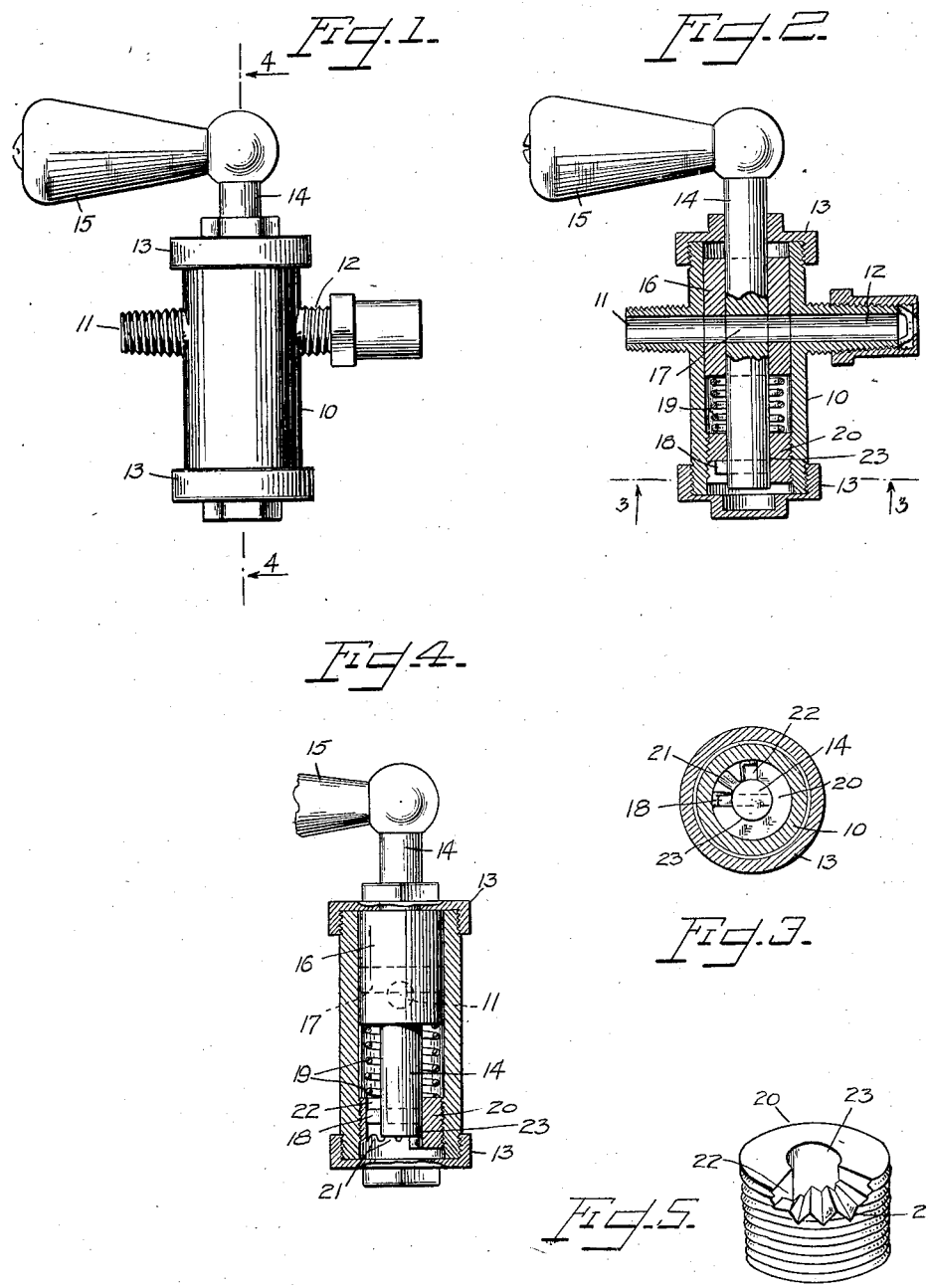
Carl Carmosin
INVENTOR
BY
his ATTORNEY.

Patented May 20, 1930

1,759,433

UNITED STATES PATENT OFFICE

CARL CARMOSIN, OF GREAT NECK, NEW YORK

SAFETY GAS COCK

Application filed August 1, 1928. Serial No. 296,815.

This invention relates to safety gas cocks intended primarily for use in connection with gas ranges and has for its object to provide in a manner hereinafter described, a gas cock having means requiring both rotary and axial adjustment of the valve to effect the opening or closing thereof, as well as to prevent the accidental or unwarranted movement of the valve from closed to open position or from any position to another.

One embodiment of my invention is illustratively exemplified in the accompanying drawing, in which, Figure 1 is a side elevational view of my improved gas cock;

Figure 2 is a longitudinal sectional view of the same;

Figure 3 is a transverse sectional view taken on line 3—3 of Figure 2;

Figure 4 is a longitudinal sectional view taken on line 4—4 of Figure 1; and

Figure 5 is a perspective view of the means used to prevent accidental rotary movement of the valve.

Referring to the drawings, 10 denotes a cylindrical valve casing having axially alined radially projecting inlet and outlet openings 11 and 12, respectively. The opposite ends of the casing are closed by screw caps 13, the upper cap being provided with a central opening through which the valve stem 14 projects to receive a handle 15 for manipulating the valve. In the bore of the casing 10, intermediate the stem 14 and integral therewith is a barrel portion 16 having a transverse bore 17 which is adapted to register at opposite ends with the inlet and outlet openings 11 and 12 of the casing 10. The lower end of the stem 14 carries a radially disposed pin or lug 18, which is yieldingly urged in an upward axial direction, with the stem by a spring 19 interposed between the lower end of the barrel 16 and a nut 20 screwed into the interior of the casing 10 adjacent its lower end, and which engages in a series of radial notches 21 cut in a recess in the lower end of the nut 20. One of the notches, denoted 22, is virtually an axial groove or keyway which extends along the bore 23 of the nut 20 through which the lower end of the stem 14 moves.

The valve when normally closed is in the position shown in Figure 4, i. e. the stem 14 has been lifted by the spring 19, the lug 18 is disposed in the groove 22 and the opening 17 in the barrel 16 is above the elevation of the two ports 11 and 12. It will be clear that accidental rotation of the handle to open the valve is quite impossible, because of the additional axial movement required of the stem. To open the valve, the handle is depressed and with it the stem 14, barrel 16 and lug 18, which slide out of the groove 22 and may then be rotated to engage any of the notches 21. Adjustment from one notch to another is accomplished by merely turning the handle, the spring allowing the lug to ride in and out of each notch.

Having now described and ascertained the nature of my said invention, what I claim and desire to secure by Letters Patent of the United States is:

1. A safety gas cock, comprising a casing having inlet and outlet openings, a cylindrical valve in said casing having a transverse bore to establish a passage between the inlet and outlet openings, a stem integral with the valve and having a radial projection at one end and a grip at the other, a serrated nut fixed in the casing, and a spring between the valve and nut to normally urge the radial projection of the stem into engagement with the serrated surface of said nut to prevent accidental rotary movement of the stem to open the valve.

2. A safety gas cock, as claimed in claim 1, in which the said fixed nut is provided with a bore to receive the said valve stem therethrough, said bore having a longitudinal guideway in its wall to enable the projection to be raised therein under normal action of the spring until the elevation of the valve bore is above that of the said inlet and outlet openings and projecting at substantially right angles thereto.

3. A safety gas valve as claimed in claim 1, in which the serrations of the fixed nut comprise radially disposed teeth on its under portion, said teeth being arranged on the bottom wall of a recess in the nut, one end of the recessed portion opening into a guideway extending through the length of the bore of the nut to accommodate the projection of the stem when the valve is turned to closed position.

In testimony whereof I affix my signature.

CARL CARMOSIN.